United States Patent Office 2,874,185
Patented Feb. 17, 1959

2,874,185

N-MYRISTYL-3-HYDROXYBUTYLAMINES AND THEIR SALTS

Frank J. Sowa, Cranford, N. J.

No Drawing. Application April 3, 1956
Serial No. 575,715

10 Claims. (Cl. 260—501)

This invention relates to a new class of chemical compounds, namely, the N-myristyl-3-hydroxybutylamines and their salts. This application is a continuation-in-part of copending application Serial No. 300,331, filed July 22, 1952, now abandoned.

Many amines and quaternary ammonium compounds are known and certain of these compounds have been found to possess bactericidal or fungicidal properties particularly when there is a long chain alkyl group attached to the nitrogen of the amine. Thus, Shelton et al. (J. A. C. S., vol. 68, pp. 753 to 759; May 1946) tested a large number of such compounds and concluded that the activity of such series reaches a peak when the cetyl group is present. They further concluded that the presence of hydroxyl groups tends to diminish the germicidal activity of the compounds tested.

As pointed out in said copending application, I have discovered that myristyl amines differ from other amines and amine salts in that their bactericidal and fungicidal activity is enhanced, provided the amine contains an alkanol group. Thus, for example, N-myristyl diethanolamine hydrochloride possesses bactericidal and fungicidal activities which are from 10 to 100 times as great as those of the corresponding octyl, undecenyl, lauryl, cetyl and stearyl compounds.

I have further discovered that the bactericidal and fungicidal activity even among the N-myristyl alkanolamines and their salts varies greatly, depending upon the nature of the alkanol group present in the compound. Thus, the N-myristyl-3-hydroxybutylamines and their salts possess surprisingly greater bactericidal and fungicidal properties than those N-myristyl amines containing other alkanol groups such as ethanol or isopropanol groups, for example.

Accordingly, the present invention is directed to N-myristyl-3-hydroxybutylamines and their salts. These compounds are not only useful as bactericidal and fungicidal agents, but further are useful as rodent repellents and may be used as detergents and emulsifying agents, and for other purposes.

Compounds of the class to which this invention relates are the amines and salts of the amines having the composition indicated by the general formula

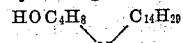

wherein R is hydrogen, alkyl or a monohydroxy alkyl radical and the hydroxyl radical in the butanol group is attached to the carbon atom third removed from the nitrogen of the amine.

When R is hydrogen, the following three amines are possible:

N-myristyl-3-hydroxy-butylamine

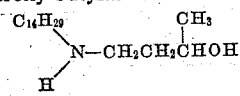

N-myristyl-3-hydroxy-2-methyl propylamine

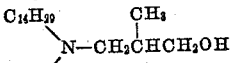

N-myristyl-3-hydroxy-1-methyl propylamine

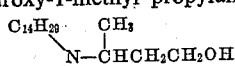

The salts of the foregoing amines may be represented by the formula

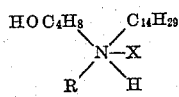

in which R has the composition indicated above and X is an anion.

Typical radicals which may be present as R in the above formulae are methyl, ethyl, propyl, butyl, octyl, lauryl and their isomers and their monohydroxy derivatives. In the alternative, R may, of course, be hydrogen.

The principal object of the present invention is to provide a new class of compounds consisting of the secondary and tertiary amines which contain a myristyl radical attached to the nitrogen of the amino group and a butanol group which has a hydroxyl attached to the carbon atom third removed from the amino group, together with the salts of such amines.

These and other objects and features of the present invention will appear from the following description thereof in which reference is made to particular compounds and methods of producing the same for the purpose of indicating the nature of the present invention and some of its particular applications, but without intending to limit the scope of the invention thereto.

The compounds of the present invention are secondary or tertiary amines as defined above and are herein referred to as "N-myristyl-3-hydroxybutylamines," whereas the compounds wherein the remaining valences of the nitrogen are satisfied by hydrogen and an anion are referred to herein as "salts."

When the compounds are salts, substantially any anion may be present such as a halide, sulfate, monoethyl sulfate, phosphate, acetate, propionate, lactate, citrate, undecylenate, tartrate, salicylate, phenate, chlorophenate, chlorophenoxyacetate, thymate and chlorothymate, for example.

In order to illustrate typical compounds of the class to which the invention relates and indicate methods in which they may be produced, the following examples are cited:

EXAMPLE I.—MYRISTYL-3-HYDROXYBUTYL AMINE

|  | Mol. Wt. | Grams Used | Moles |
|---|---|---|---|
| Myristyl Bromide | 277.2 | 277.2 | 1.0 |
| 4-amino-2-butanol | 89.1 | 187.1 | 2.1 |

The myristyl bromide and the 4-amino-2-butanol were weighed out in a 1 liter 3 necked flask equipped with a mechanical stirrer and reflux condenser. The reaction flask was heated for about five minutes and then the heat was discontinued but the reaction mixture maintained a temperature of 100° C. for three hours. Solid separated. It was again heated to 100° C. for an additional three hours. The whole was then washed twice with water, treated with caustic soda solution, washed again three times with water and then separated. Benzene was then added to remove the water. After the benzene was distilled off at atmospheric pressure, the compound was distilled under reduced pressure.

B. pt.=186–206° C. (3 mm.) mostly at 186–188° C. (3 mm.)

M. pt.=58–62° C.

It is believed to have the following structural formula

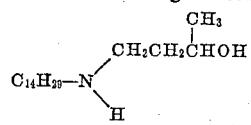

EXAMPLE II

N-myristyl-3-ydroxy-secondary butylamine (N-myristyl-3-hydroxy-1-methylpropylamine) may be prepared by the method described under Example I by the reaction of the myristyl chloride, bromide or iodide with 3-hydroxy-secondary butylamine or as follows:

Eight hundred fifty-two (852) grams (4 moles) of myristyl amine was weighed in a two liter three necked flask equipped with a mechanical stirrer and a dropping funnel. The myristyl amine was warmed to 90° and then 3-chlorobutanol-1 was added dropwise while stirring and maintaining the temperature between 90°–100° C. throughout the addition. The addition was stopped when 217 g. (2 moles) of 3-chlorobutanol-1 had been added. The contents were maintained, while stirring, at 100° C. for two hours more.

The composition was thoroughly washed three times with 350 cc. of a 10% caustic soda solution and then three times with 400 cc. portion of water. The composition was dried by the addition of 500 cc. of benzene and distilling the benzene-water azeotrope at atmospheric pressure. The contents were fractionated at a reduced pressure of one millimeter of mercury. After recovering the myristyl amine, the N-myristyl-3-hydroxy-1-methylpropylamine was distilled and the fraction boiling 145–158° C. (1 mm.) was collected. Practically all boiled at 152° C. (1 mm.) and had a melting point of around 58–59° C. It is believed to have the following structural formula

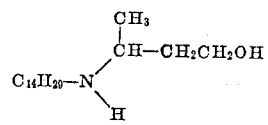

Other typical amines of the class to which this invention relates are as follows:

EXAMPLE III.—N-MYRISTYL-3-HYDROXY-2-METHYLPROPYLAMINE

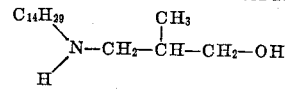

EXAMPLE IV.—N-MYRISTYL DI(3-HYDROXYBUTYL)AMINE

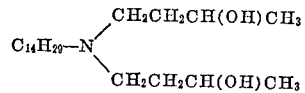

EXAMPLE V.—N-MYRISTYL, N-LAURYL-3-HYDROXYBUTYLAMINE

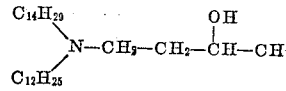

Salts of these and other amines may be prepared in the usual way by contacting the amine, preferably in a solvent with a molar equivalent quantity of an acidic compound or a lower molar equivalent amount of the acidic substance if desired in the event that the acidic substance has more than one replaceable acid hydrogen.

Other typical salts of the present invention which have been prepared are the following:

EXAMPLE VI.—MYRISTYL 3-HYDROXYBUTYL AMMONIUM CHLORIDE

| | Mol. Wt. | Grams Used | Moles |
|---|---|---|---|
| N-myristyl-3-hydroxybutyl amine | 285.3 | 45.0 | 0.15 |
| Hydrogen Chloride | 36.5 | 5.5 | 0.15 |

The amine was dissolved in 54 grams of benzene in a flask equipped with a mechanical stirrer and inlet tube. Dry HCl was allowed to bubble into the reaction flask for five minutes, at the end of which time 7.5 grams of HCl was absorbed. The reaction mixture turned pink at this point. On cooling, crystals formed, these were filtered and recrystallized twice. The final product was white in color and is believed to have the following structural formula

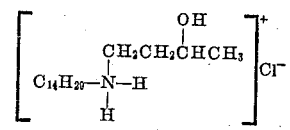

It has the following phyiscal properties: Melting point 118° C., softens at 108° C., flows at 160° C.

Solubilities:
  Soluble in hot benzene, slightly soluble in cold
  Soluble in hot ethyl acetate, slightly soluble in cold
  Soluble in hot and cold alcohol
  Soluble in hot water and slightly soluble in cold

EXAMPLE VII.—N-MYRISTYL-3-HYDROXYBUTYL AMMONIUM BROMIDE

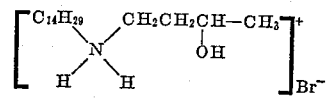

EXAMPLE VIII.—N-MYRISTYL-3-HYDROXYBUTYL AMMONIUM IODIDE

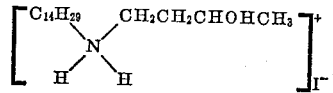

EXAMPLE IX.—N-MYRISTYL-3-HYDROXYBUTYL AMMONIUM PROPIONATE

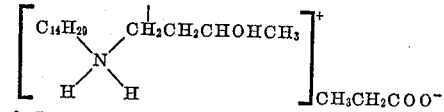

The influence of the myristyl group as compared with other long chain alkyl groups, in increasing the bactericidal and fungicidal activity of alkyl alkanol amines and their salts is made evident by the following results obtained in carrying out tests under identical conditions.

*Table I*

| Compound | S. aureus | B. typhosus | Interdigitale | T. rubrum |
|---|---|---|---|---|
| Decyl 3-hydroxy butyl ammonium chloride | no action 1 to 1,000. | no action 1 to 1,000. | no action 1 to 1,000. | no action 1 to 1,000. |
| Lauryl 3-hydroxy butyl ammonium chloride. | effective 1 to 1,000. not 1 to 5,000. | effective 1 to 1,000. not 1 to 5,000. | do. | Do. |
| Myristyl 3-hydroxy butyl ammonium chloride. | effective 1 to 10,000. | effective 1 to 10,000. | effective 1 to 5,000. | effective 1 to 5,000. |

The same influence is indicated by the following tests:

Table II

| Compound | S. aureus | B. typhosus |
|---|---|---|
| Decyl 3-hydroxy-1-methylpropyl ammonium chloride. | no action 1 to 1,000. | no action 1 to 1,000. |
| Myristyl 3-hydroxy-1-methylpropyl ammonium chloride. | effective 1 to 5,000. | effective 1 to 5,000. |
| Cetyl 3-hydroxy-1-methylpropyl ammonium chloride. | effective 1 to 1,000—not 1 to 5,000. | effective 1 to 1,000—not 1 to 5,000. |
| Stearyl 3-hydroxy-1-methylpropyl ammonium chloride. | -----do--------- | not effective 1 to 1,000. |

An even more striking increase in the bactericidal and fungicidal activity is effected by reason of the presence of the 3-hydroxy butyl radical as compared with its homologues as evidenced by the results of tests set forth in the following table.

Table III

| Compound | S. aureus | B. typhosus | Interdigitale | T. rubrum |
|---|---|---|---|---|
| Myristyl 3-hydroxy butyl amine | effective 1 to 10,000. | effective 1 to 10,000. | 1 to 5,000. | 1 to 5,000. |
| Myristyl di-iso-propanol amine | effective 1 to 1,000. not 1 to 5,000. | effective 1 to 1,000. not 1 to 5,000. | not effective 1 to 1,000. | effective 1 to 1,000. not 1 to 5,000. |
| Myristyl diethanol amine | not effective 1 to 1,000. not effective 1 to 5,000. | effective 1 to 1,000. not 1 to 5,000. | effective 1 to 1,000. not 1 to 5,000. | effective 1 to 1,000. not 1 to 5,000. |

The functional character of the hydroxyl group in the butyl radical of the N-myristyl compounds of the present invention is demonstrated by the results obtained in the following tests:

Table IV

| Compound | S. aureus | B. typhosus | Interdigitale | T. rubrum |
|---|---|---|---|---|
| Myristyl butyl ammonium chloride | effective 1 to 1,000. not 1 to 5,000. | effective 1 to 1,000. not 1 to 5,000. | not effective 1 to 1,000. | not effective 1 to 1,000. |
| Myristyl 3-hydroxy butyl ammonium chloride. | effective 1 to 10,000. | effective 1 to 10,000. | effective 1 to 5,000. | effective 1 to 5,000. |

All of the tests referred to in Tables I to IV above were conducted in accordance with the procedure given in Department of Agriculture Bulletin No. 198.

Compounds of the class of which the foregoing examples are typical may be used as bactericidal and fungicidal agents in various media as required for any particular use. The compounds are stable and may be stored for long periods of time at room temperatures and without deterioration.

Solutions containing 1 part by weight of N-myristyl-3-hydroxybutyl ammonium propionate dissolved in 5000 parts of water are bactericidal with respect to S. aureus and B. typhosus. In fact, every member of the class of compounds consisting of the N-myristyl-3-hydroxybutyl amines and their salts which has been tested has been found to be effective for use as bactericidal and fungicidal agents in relatively dilute solutions.

Bactericidal and fungicidal, or bacteriostatic, fungistatic compositions can be made by incorporating the N-myristyl-3-hydroxy-butylamines or their salts, described herein, in various materials as water and organic solvents such as hydrocarbons, alcohols, waxes, ointments, cutting oils, soaps, plastics, detergents, dispersions and used as such; for agricultural applications such as in seed treatments, control of scab and other diseases occurring on fruit or vegetation and control of diseases that occur on the turf grasses, as well as many industrial applications such as the treatment of textiles, leather, paper and in the control of slime. In soap, for example, around one part to one thousand parts of soap is sufficient to show activity. Greater or lesser amounts may be used if desired depending upon the activity required and in this case, the free amine is preferred but not required where the soap is a salt of a fatty acid.

It is also found that these compounds have rodent repellent properties when incorporated in food, rope, twine, textiles, paper, plastics, seeds, wood, etc., and as barriers to rodent attack when applied to the surface, either alone or in suitable coating compositions, of box board, paper surfaces, plastic coatings for electrical wire insulation, etc. For example, 0.5% by weight of N-myristyl-3-hydroxy-1-methyl propylamine has a rodent repellency index K of 97.0 as defined by Dr. James B. De Witt, Patuxent Research Refuge, U. S. Department of Interior.

Although typical compounds of the class consisting of the N-myristyl-3-hydroxybutyl amines and their salts have been cited above and preferred methods of producing the same has been described, it is not intended to limit the invention to these specific compounds and methods since the N-myristyl-3-hydroxybutyl amines and their salts constitute a new class of compounds possessing unique and characteristic properties.

I claim:

1. N-myristyl amines and salts thereof wherein there is at least one 3-hydroxybutyl radical attached to the amino group.

2. A hydro-halogen salt of an N-myristyl amine wherein there is at least one 3-hydroxybutyl radical attached to the amino group.

3. A compound having the composition indicated by the formula

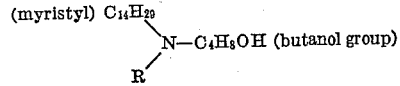

wherein R is selected from the group consisting of hydrogen, alkyl and monohydroxy alkyl radicals, and the hydroxyl radical of the butanol group is attached to the carbon atom third removed from the nitrogen of the amine.

4. A compound having the composition indicated by the formula

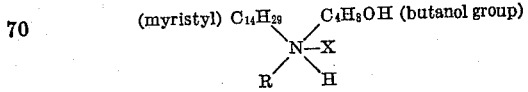

wherein R is selected from the group consisting of hydrogen, alkyl and monohydroxy alkyl, X is an anion, and the hydroxyl radical of the butanol group is attached to the carbon atom third removed from the nitrogen of the amine.

5. N-myristyl-3-hydroxybutylamine.
6. N-myristyl-3-hydroxy-1-methyl propylamine.
7. N-myristyl-3-hydroxy-2-methyl propylamine.
8. N-myristyl-3-hydroxybutyl ammonium halide.
9. N-myristyl-3-hydroxybutyl ammonium chloride.
10. N-myristyl-3-hydroxybutyl ammonium propionate.

References Cited in the file of this patent

UNITED STATES PATENTS

| | | |
|---|---|---|
| 1,836,048 | Somerville | Dec. 15, 1931 |
| 2,297,221 | Huttenlocher | Sept. 29, 1942 |
| 2,541,088 | Nikawitz | Feb. 13, 1951 |
| 2,580,474 | Sowa | Jan. 1, 1952 |

OTHER REFERENCES

Shelton et al.: J. A. C. S., vol. 68, 753–759 (1946).